(12) United States Patent
Madej et al.

(10) Patent No.: US 8,960,550 B2
(45) Date of Patent: Feb. 24, 2015

(54) MINIMIZING MISDECODES IN ELECTRO-OPTICAL READERS

(75) Inventors: Dariusz J. Madej, Shoreham, NY (US); Joseph Cai, Rocky Point, NY (US); Duanfeng He, South Setauket, NY (US); Miroslav Trajkovic, Centereach, NY (US); Dayou Wang, Port Jefferson Station, NY (US); Michelle Wang, Port Jeff Station, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 212 days.

(21) Appl. No.: 12/317,846

(22) Filed: Dec. 30, 2008

(65) Prior Publication Data

US 2010/0163625 A1 Jul. 1, 2010

(51) Int. Cl.
*G02B 26/10* (2006.01)
*G06K 7/10* (2006.01)

(52) U.S. Cl.
CPC .................................. *G06K 7/10871* (2013.01)
USPC ................................................... 235/462.25

(58) Field of Classification Search
USPC ................................................... 235/462.25
See application file for complete search history.

(56) References Cited

U.S. PATENT DOCUMENTS

| | | | |
|---|---|---|---|
| 4,613,895 A | 9/1986 | Burkey et al. | |
| 4,794,239 A | 12/1988 | Allais | |
| 5,304,786 A | 4/1994 | Pavlidis et al. | |
| 5,446,271 A | 8/1995 | Cherry et al. | |
| 5,703,349 A | 12/1997 | Meyerson et al. | |
| 6,761,314 B2 | 7/2004 | Schuessler | |
| 2003/0057282 A1* | 3/2003 | Brandt et al. | 235/462.07 |
| 2004/0262395 A1* | 12/2004 | Longacre et al. | 235/462.15 |
| 2006/0091216 A1* | 5/2006 | Page | 235/462.07 |
| 2007/0119944 A1* | 5/2007 | Cai | 235/462.25 |
| 2009/0057409 A1* | 3/2009 | Feinstein et al. | 235/462.02 |

(Continued)

FOREIGN PATENT DOCUMENTS

EP 1693780 8/2006

OTHER PUBLICATIONS

IDAutomation, IDAutomation USB Barcode Scanner with Databar, Dec. 16, 2008, https://web.archive.org/web/20081216033210/http://www.idautomation.com/scanners/usb-barcode-scanner.html, http://www.idautomation.com/barcode-scanners/programming-manuals/SC5D-USB-Scanner-Manual.pdf.*

(Continued)

*Primary Examiner* — Michael G Lee
*Assistant Examiner* — David Tardif
(74) *Attorney, Agent, or Firm* — Nong-Qiang Fan

(57) ABSTRACT

An arrangement for, and a method of, minimizing misdecodes of GS1 DataBar Limited (Databar-limited) symbols in a reader for electro-optically reading symbols of different symbologies, such as Universal Product Code (UPC) Version A (UPC-A) symbols, includes a data capture assembly for capturing light from a target symbol, and for generating an electrical signal indicative of the captured light; and a controller for processing and decoding the electrical signal, and for determining whether the decoded signal is indicative of a Databar-limited symbol, and for determining whether the decoded signal has characteristics indicative of a different symbology, such as the UPC-A symbol, to indicate whether a misdecode of the Databar-limited symbol has occurred.

18 Claims, 3 Drawing Sheets

(56) References Cited

U.S. PATENT DOCUMENTS

2010/0163625 A1 7/2010 Madej et al.
2010/0187314 A1 7/2010 Cai et al.

OTHER PUBLICATIONS

DAutomation, IDAutomation USB Barcode Scanner with Databar, Dec. 16, 2008, https://web.archive.org/web/20081216033210/http://www.idautomation.com/scanners/usb-barcode-scanner.html, http://www.idautomation.com/barcode-scanners/programming-manuals/SC5D-USB-Scanner-Manual.pdf.*

International Search Report and Written Opinion dated Apr. 6, 2010 in related case PCT/US2009/069023.

International Preliminary Report on Patentability and Written Opinion for International Application No. PCT/US2009/069023 mailed on Jul. 14, 2011.

Non Final Office Action mailed Jan. 6, 2011 in related U.S. Appl. No. 12/322,134, Joseph Cai, filed Jan. 29, 2009.

Final Office Action mailed Jun. 28, 2011 in related U.S. Appl. No. 12/322,134, Joseph Cai, filed Jan. 29, 2009.

Non-Final Office Action mailed Jun. 4, 2013, in U.S. Appl. No. 12/322,134, Joseph Cai, filed Jan. 29, 2009.

Notice of Allowance Action mailed Oct. 8, 2013, in U.S. Appl. No. 12/322,134, Joseph Cai, filed Jan. 29, 2009.

Notice of Allowance Action mailed Apr. 14, 2014, in U.S. Appl. No. 12/322,134, Joseph Cai, filed Jan. 29, 2009.

* cited by examiner

MINIMIZING MISDECODES IN ELECTRO-OPTICAL READERS

DESCRIPTION OF THE RELATED ART

Moving laser beam readers or laser scanners, as well as solid-state imaging systems or imaging readers, have both been used, in both handheld and hands-free modes of operation, to electro-optically read bar code symbols having different bar and space patterns that are used to represent different characters. Sets of these patterns are grouped together to form a symbology. There are many types of bar code symbologies, each having their own special characteristics and features. Most symbologies are designed to meet the needs of a specific application or industry.

The moving laser beam reader generally includes a laser for emitting a laser beam, a focusing lens assembly for focusing the laser beam to form a beam spot having a certain size at a focal plane in a range of working distances, a scan component for repetitively scanning the beam spot across a target symbol in a scan pattern, for example, a scan line or a series of scan lines, across the target symbol multiple times per second, e.g., forty times per second, a photodetector for detecting light reflected and/or scattered from the symbol and for converting the detected light into an analog electrical signal, and signal processing circuitry including a digitizer for digitizing the analog signal, and a microprocessor for decoding the digitized signal based upon a specific symbology used for the symbol.

The imaging reader includes a solid-state imager or sensor having an array of cells or photosensors, which correspond to image elements or pixels in a field of view of the imager, an illuminating light assembly for illuminating the field of view with illumination light from an illumination light source, e.g., a laser or one or more light emitting diodes (LEDs), and an imaging lens assembly for capturing return ambient and/or illumination light scattered and/or reflected from the symbol being imaged over a virtual scan pattern, e.g., a virtual scan line or a series of virtual scan lines, over a range of working distances. Such an imager may include a one- or two-dimensional charge coupled device (CCD) or a complementary metal oxide semiconductor (CMOS) device and associated circuits for producing electronic analog signals corresponding to a one- or two-dimensional array of pixel information over the field of view. Again, signal processing circuitry including a digitizer is used for digitizing the analog signal, and a microprocessor is used for decoding the digitized signal based upon a specific symbology used for the symbol.

It is therefore known to use the imager for capturing a monochrome image of the symbol as, for example, disclosed in U.S. Pat. No. 5,703,349. It is also known to use the imager with multiple buried channels for capturing a full color image of the symbol as, for example, disclosed in U.S. Pat. No. 4,613,895. It is common to provide a two-dimensional CCD with a 640×480 resolution commonly found in VGA monitors, although other resolution sizes are possible.

As advantageous as both types of readers are in reading symbols, it is desirable in many applications for each reader to read symbols of different symbologies. One older, omnipresent symbology is the Universal Product Code (UPC) Version A (UPC-A) symbol, which is comprised of a linear arrangement of bars and spaces (each termed as an element) of various widths that, when decoded, uniquely identify a product and its manufacturer. Another newer symbology is the GS1 DataBar Code, which was formerly known as the Reduced Space Symbology (RSS) code, and especially the GS1 DataBar Limited (Databar-limited) code whose symbol is more than 50% smaller than the UPC-A symbol and, hence, makes it particularly useful for identifying small and hard-to-mark products such as produce and pharmaceutical items. The Databar-limited symbol is also comprised of a linear arrangement of bars and spaces (each termed as an element) of various widths that, when decoded, uniquely identify a product and its manufacturer, as well as additional information, such as serial numbers, lot numbers and expiration dates and, thus, provides for greater product identification, traceability, quality control, and more flexible coding for coupon applications. The Databar-limited symbol is designed to replace or expand use of the UPC-A symbol.

One concern for a reader that is capable of reading both UPC-A and Databar-limited symbols is that a complete Databar-limited symbol can be found in a UPC-A symbol, and this may result in a symbol misdecode or misread. The Databar-limited symbol does not require a clear margin around the Databar-limited symbol. Hence, a fragment or portion of the UPC-A symbol could contain a completely valid, element-by-element, Databar-limited symbol and, hence, the UPC-A fragment could be mistaken for a Databar-limited symbol. Analysis indicates that about 89,000 valid Databar-limited symbols could be embedded in a UPC-A symbol. It is also possible that a complete Databar-limited symbol can be found in other symbologies. However, a misdecode from the UPC-A symbol is considered of most concern since these two symbologies are expected to coexist in the same application.

This type of symbol misdecode is more likely to occur if Databar-limited decoding is attempted before UPC-A decoding. Yet, even when UPC-A decoding is designed to be attempted first, this symbol misdecode could occur when the UPC-A decoding is disabled and the Databar-limited decoding is enabled. This symbol misdecode could also occur when, for example, a tilted scan line overlies the symbol at an angle inclined relative to the horizontal scan direction, rather than entirely along the horizontal scan direction, or when the scan line is too short. In the case of a handheld reader, a short line could occur if an operator incorrectly aims the reader at the symbol. In the case of a reader having an omnidirectional scan pattern, several tilted short lines always overlie the symbol at an inclined angle. In the case of an imaging reader, a short or a tilted line could occur if the imager incorrectly recognizes the margin or bounding box surrounding the symbol. Accordingly, there is a need for an arrangement for, and a method of, minimizing, and preferably preventing, such symbol misdecodes in such readers.

SUMMARY OF THE INVENTION

One feature of this invention resides, briefly stated, in an arrangement for, and a method of, minimizing misdecodes of GS1 DataBar Limited (Databar-limited) symbols in a reader for electro-optically reading symbols of different symbologies. A data capture assembly is operative for capturing light from a target symbol, and for generating an electrical signal indicative of the captured light. A programmed microprocessor or controller is operative for processing and decoding the electrical signal, and for determining whether the decoded signal is indicative of a Databar-limited symbol, and for determining whether the decoded signal has characteristics indicative of a different symbology other than the Databar-limited symbol, such as a Universal Product Code (UPC) Version A (UPC-A) symbol, to indicate whether a misdecode of the Databar-limited symbol has occurred.

In one embodiment, the reader is a moving laser beam reader, which includes a laser for emitting a laser beam, a scanner for sweeping the laser beam in a scan line across the target symbol for reflection and scattering therefrom, and a detector for detecting the captured light from the target symbol. In another embodiment, the reader is an imaging reader, which advantageously includes an illuminator for illuminating the target symbol, and a solid-state imager, such as a charge coupled device (CCD) or a complementary metal oxide semiconductor (CMOS) device, for detecting the return light from the target symbol.

In accordance with this invention, the controller is operative for determining whether the decoded signal has characteristics indicative of a UPC-A symbol to indicate that a misdecode of the Databar-limited symbol has occurred. The controller is operative for checking whether a finder pattern of bars and spaces from the Databar-limited symbol matches a center guard pattern of bars and spaces from a valid UPC-A symbol and/or for checking whether a finder pattern from the Databar-limited symbol is one of a set of known finder patterns compatible with a valid UPC-A symbol and/or for checking whether contextual information from the Databar-limited symbol is available. The controller is also operative for determining whether the decoded signal is indicative of a UPC-A symbol.

The method of minimizing misdecodes of Databar-limited symbols in a reader for electro-optically reading symbols of different symbologies, is performed by capturing light from a target symbol, generating an electrical signal indicative of the captured light, processing and decoding the electrical signal, determining whether the decoded signal is indicative of a Databar-limited symbol, and determining whether the decoded signal has characteristics indicative of a different symbology other than the Databar-limited symbol to indicate whether a misdecode of the Databar-limited symbol has occurred.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
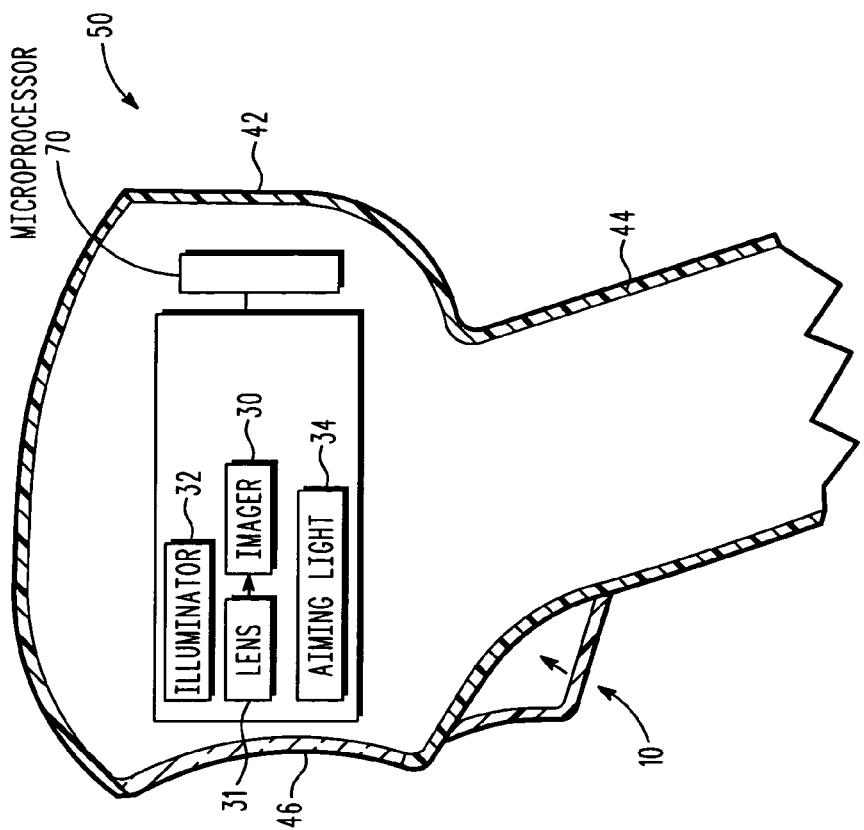
FIG. 1 is a schematic diagram of a handheld moving laser beam reader for electro-optically reading symbols in accordance with the present invention.

FIG. 1 depicts a moving laser beam reader 40 for electro-optically reading target symbols of different symbologies that may use, and benefit from, the present invention. The beam reader 40 includes a scanner 62 in a handheld housing 42 having a handle 44 on which a trigger 10 for initiating reading is mounted. The scanner 62 is operative for scanning an outgoing laser beam from a laser 64 and/or a field of view of a light detector or photodiode 66 in a scan pattern, typically comprised of one or more scan lines, multiple times per second, for example, forty times per second, through a window 46 across the symbol for reflection or scattering therefrom as return light detected by the photodiode 66 during reading. The beam reader 40 also includes a focusing lens assembly or optics 61 for optically modifying the outgoing laser beam to have a large depth of field, and a digitizer 68 for converting an electrical analog signal generated by the detector 66 from the return light into a digital signal for subsequent decoding by a microprocessor or controller 70 into data indicative of the symbol being read.

Figure 2:
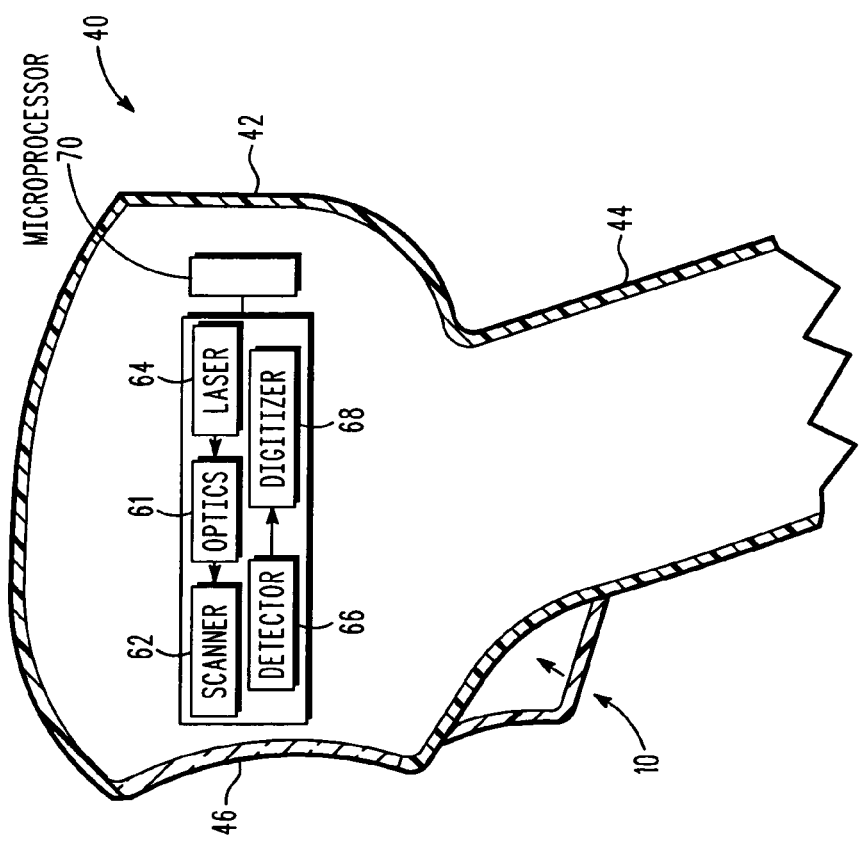
FIG. 2 is a schematic diagram of a handheld imaging reader for electro-optically reading symbols in accordance with the present invention.

FIG. 2 depicts an imaging reader 50 for imaging target symbols of different symbologies to be electro-optically read, as well as non-symbols, which may use, and benefit from, the present invention. The imaging reader 50 includes a one- or two-dimensional, solid-state imager 30, preferably a CCD or a CMOS array, mounted in the handheld housing 42 having the handle 44 on which the trigger 10 for initiating reading is mounted. The imager 30 has an array of image sensors operative, together with an imaging lens assembly 31, for capturing return light reflected and/or scattered from the target through the window 46 during the imaging to produce an electrical signal indicative of a captured image for subsequent decoding by the controller 70 into data indicative of the symbol being read, or into a picture of the target.

When the reader 50 is operated in low light or dark ambient environments, the imaging reader 50 includes an illuminator 32 for illuminating the target during the imaging with illumination light directed from an illumination light source through the window 46. Thus, the return light may be derived from the illumination light and/or ambient light. The illumination light source comprises one or more light emitting diodes (LEDs) or a laser. An aiming light generator 34 may also be provided for projecting an aiming light pattern or mark on the target prior to imaging.

In operation of the imaging reader 50, the controller 70 sends a command signal to drive the illuminator LEDs/laser 32 for a short time period, say 500 microseconds or less, and energizes the imager 30 during an exposure time period of a frame to collect light from the target during said time period. A typical array needs about 16-33 milliseconds to read the entire target image and operates at a frame rate of about 30-60 frames per second. The array may have on the order of one million addressable image sensors.

Figure 3:
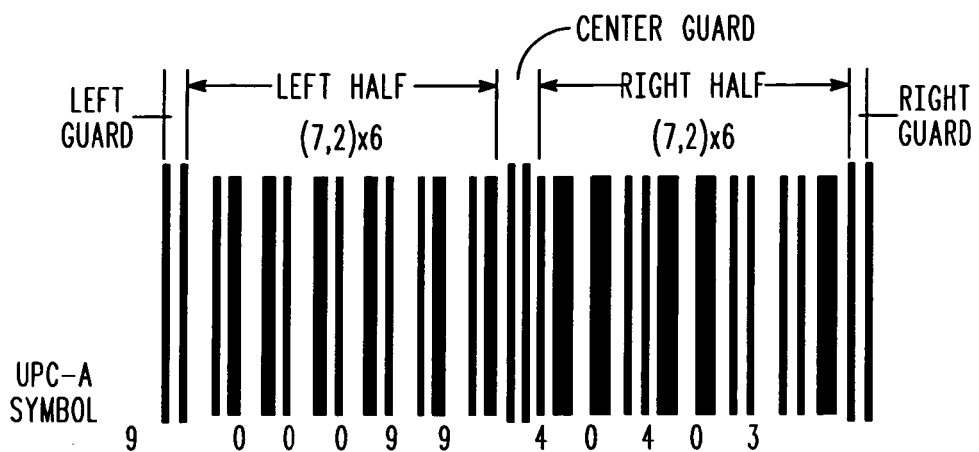
FIG. 3 is a view of a UPC-A symbol depicting some of its structure.

FIG. 3 depicts a standard Universal Product Code (UPC) Version A (UPC-A) symbol designed to uniquely identify a product and its manufacturer. The UPC-A symbol is a fixed length, numeric, continuous code and employs patterns of bars and spaces to encode a twelve digit code. The first six digits represent the manufacturer of a labeled product; the next five digits are a unique product identifier code; and the twelfth digit is a check character, based on the previous eleven digits of data. The check digit has a value mathematically based on the first eleven digits encoded in the symbol. A weighting scheme is used in its calculation, so that the check digit also protects against transposition errors if the digits are manually entered.

The structure of the standard UPC-A symbol is physically arranged into halves. The first six digits (i.e., the left half) and the second six digits (i.e., the right half) are separated by two center guard bars. The two symbol halves are then enclosed by two left guard bars and two right guard bars. The guard bars are start/stop patterns. Each bar or space of the UPC-A symbol can have four different widths. The narrowest width is termed a "module" and, thus, each bar and each space has a width which may be one, two, three or four modules wide. A module varies between 7.8 mils and 26 mils, with 13 mils being nominal. The first six digits are encoded as two bars and two spaces within seven modules and is commonly described by a (7, 2) designation. The last six digits are also encoded as two bars and two spaces within seven modules and is commonly described by a (7, 2) designation. Each of the right and left guard bars comprise a bar, followed by a space, followed by a bar and is three modules wide. The center guard bars comprise a space, followed by a bar, followed by a space, followed by a bar, followed by a space and is five modules wide.

The bar height of either half of the standard UPC-A symbol is greater than the width of the respective halves in order to ensure that at least one of two orthogonal scan lines will be able to pass completely through each half of the UPC-A symbol, thereby allowing omnidirectional scanning. The controller can independently decode the left and the right halves of the symbol. The right, left and center, guard bars are usually printed with a greater height than the other bars in the symbol.

The European Article Numbering (EAN) symbology is a superset of the UPC symbology. An EAN Version 13 (EAN-13) symbol contains the same number of bars as a UPC-A symbol, and includes a country code designation. The product numbering code is the same for EAN-13 and UPC-A symbols to identify a product worldwide.

Figure 4:
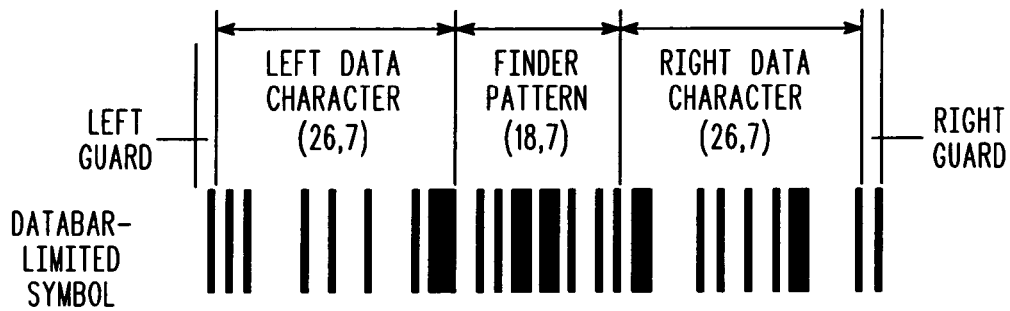
FIG. 4 is a view of a Databar-limited symbol depicting some of its structure.

FIG. 4 depicts a standard GS1 DataBar Limited (Databar-limited) symbol, which was formerly known as a Reduced Space Symbology (RSS) symbol. The Databar-limited symbol encodes fourteen digits and is more than 50% smaller than the UPC-A and EAN-13 symbols and, hence, makes it particularly useful for identifying small and hard-to-mark products such as produce and pharmaceutical items. The Databar-limited symbol is also comprised of a linear arrangement of bars and spaces (each termed as an element) of various widths that, when decoded, uniquely identify a product and its manufacturer, as well as additional information, such as serial numbers, lot numbers and expiration dates and, thus, provides for greater product identification, traceability, quality control, and more flexible coding for coupon applications. The Databar-limited symbol is designed to replace or expand use of the UPC-A symbol and/or the EAN-13 symbol.

The structure of the standard Databar-limited symbol has a left data character and a right data character, each commonly described with a (26, 7) designation and, therefore, each has 7 bars and 7 spaces, and is 26 modules in width. A check character or finder pattern is described with an (18, 7) designation and, therefore, has 7 bars and 7 spaces, and is 18 modules in width, and is located between the right and left data characters. The Databar-limited symbol also has a left guard comprised of one space and one bar, and a right guard comprised of one space and one bar. The Databar-limited symbol can encode over four trillion numbers and is 74 modules wide. Each bar and space can be a minimum of 7 modules wide and a maximum of 19 modules wide. A checksum is calculated by multiplying each character's module width by a weighting factor based on the data character number and the element's ordinal position.

Both UPC-A (FIG. 3) and Databar-limited (FIG. 4) symbols are decodable and readable by readers of the type depicted in FIG. 1 or FIG. 2. As discussed above, a complete Databar-limited symbol can sometimes be found in a UPC-A symbol or the EAN-13 symbol, and this may result in a symbol misdecode or misread. The Databar-limited symbol does not require a clear margin around the Databar-limited symbol. Hence, a fragment or portion of the UPC-A symbol could contain a completely valid, element-by-element, Databar-limited symbol and, hence, the UPC-A fragment could be mistaken for a Databar-limited symbol. Analysis indicates that about 89,000 valid Databar-limited symbols could be embedded in a UPC-A symbol in a case when both symbols have a standard polarity, i.e., the bars are printed in a dark color and the spaces are printed in a light color. Alternatively, symbols can be printed with an inversed polarity, in which case, the bars are printed in a light color and the spaces are printed in a dark color, thereby yielding many more such cases of mistaken symbols. This symbol misdecode could occur, for example, as described above, when the real or virtual scan line is tilted or too short, or when Databar-limited decoding is tried ahead of UPC-A decoding or EAN-13 decoding, or when UPC-A decoding or EAN-13 decoding is disabled and Databar-limited decoding is enabled.

Figure 5:
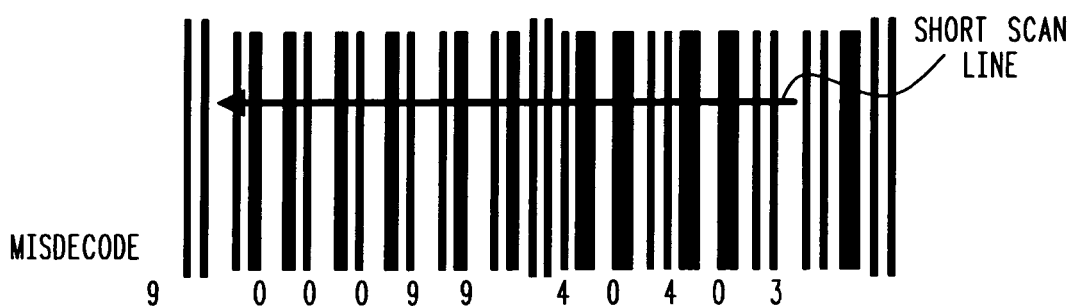
FIG. 5 is a view of the UPC-A symbol of FIG. 3, wherein the arrow depicts a fragment which contains a valid Databar-limited symbol of the type shown in FIG. 4.

One type of symbol misdecode is illustrated in FIG. 5, wherein the UPC-A symbol of FIG. 3 is overlaid by an arrow illustrating a short scan line over a fragment or portion of the UPC-A symbol. The module widths for the UPC-A symbol, reading from left-to-right, are set forth, together with the module widths for a valid Databar-limited symbol. A box is drawn around the module widths for a valid Databar-limited symbol that are contained within, and are common with, the module widths for the UPC-A symbol. One aspect of this invention is to minimize, and preferably eliminate, such symbol misdecodes in such readers.

Figure 6:
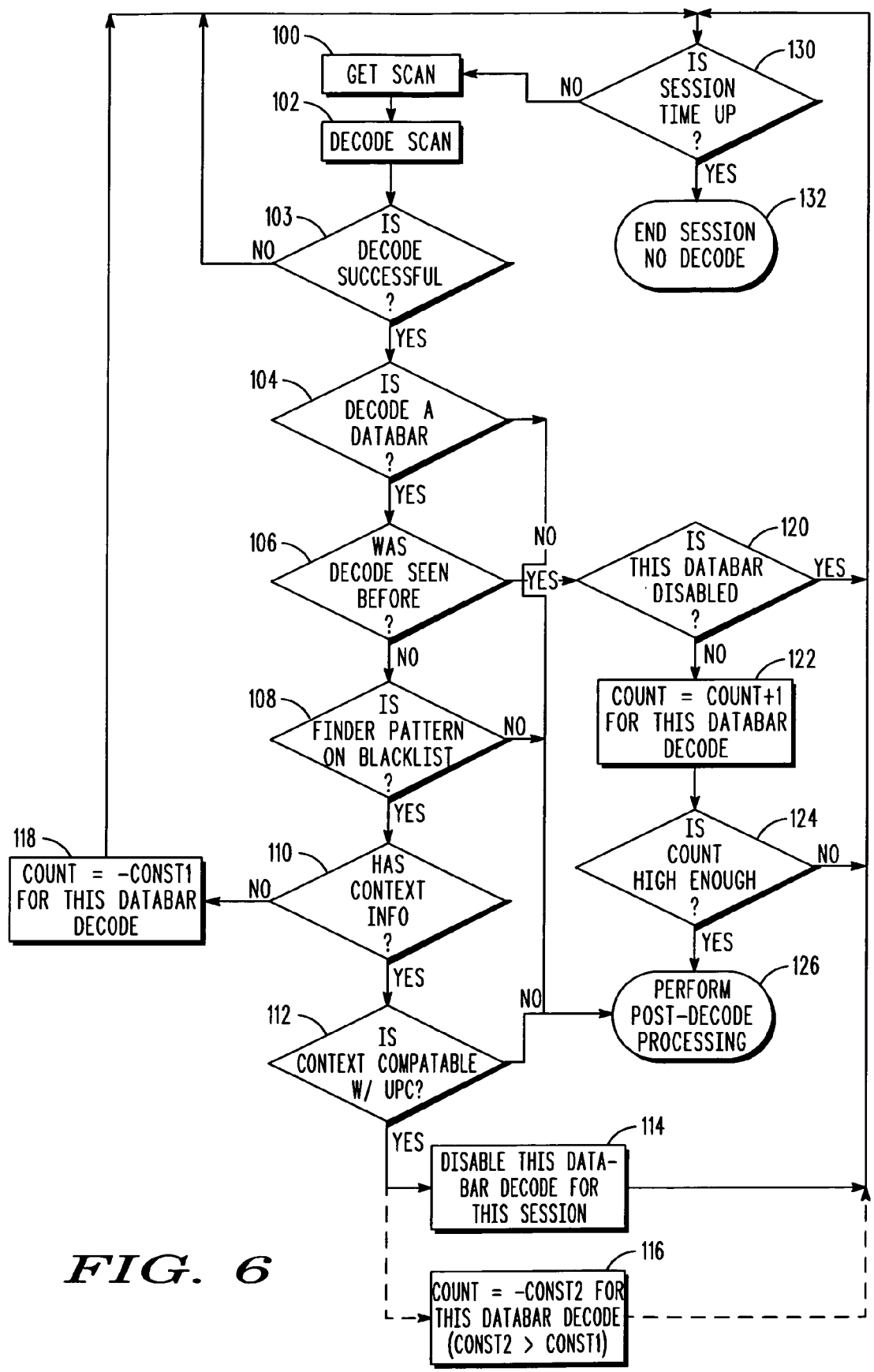
FIG. 6 is a flow chart of steps performed in accordance with the method of the present invention.

Hence, with the aid of the flow chart of FIG. 6, the programmed microprocessor or controller 70 is operative, in block 100, for getting a scan to obtain the electrical signal derived from a target symbol and generated by the digitizer 68 or by the electronic circuitry associated with the imager 30 and, in block 102, for decoding that electrical signal and, in block 103, for determining whether the decode was successful. If the decode was unsuccessful, then the controller 70 determines whether a preestablished session time has elapsed in block 130. If not, then the controller 70 repeats the functions of blocks 100, 102 and 103 until the session time has elapsed. If the session time elapses without a successful decode, then the session ends at block 132. If the decode was successful, now, in a post-decode check, it must be determined whether the decode indicated a Databar-limited symbol, and, if so, whether the target symbol was indeed a Databar-limited symbol, as intended, or a fragment of a UPC-A symbol, as not intended. In other words, the controller 70 must distinguish between Databar-limited symbols and UPC-A symbols. If it is a UPC-A fragment, then a misdecode could be declared, and the decode results are discarded. If it is not a UPC-A fragment, then a successful Databar-limited decode could be declared, and the Databar-limited decode results are sent to a remote host for further processing.

The post-decode check is performed by one or more of the following screening steps. One initial screening step involves having the controller 70 check at block 104 whether the decode is a Databar-limited decode. If not, then the decode is from a UPC-A symbol or some other symbology, and the results are sent to block 126 where post-decode processing is performed, e.g., the results are sent to a remote host. If the decode is a Databar-limited decode, then, as discussed above, it could also be a UPC-A fragment, in which case, additional screening steps are performed.

At block 106, the controller 70 checks whether the decode has been seen before in the current reading session. If so, then the controller 70 checks whether the Databar-limited decoder has been disabled at block 120. If so, then the decode must be from a UPC-A symbol. If not, then the decode could still be either a UPC-A fragment or a Databar-limited symbol, in which case, the controller increments a counter at block 122 and, if the count is determined to be high enough at block 124, i.e., meets a predetermined count, then the decode must be from a Databar-limited symbol, and the decode is then sent to block 126 for post-decode processing. If the predetermined count has not been met, then the decode could still be either a UPC-A fragment or a Databar-limited symbol, in which case, if the session time has not elapsed, then the controller 70 repeats the functions of blocks 100, 102, 103, 104, 106, 120, 122 and 124 until the predetermined count has been met, or until block 104 passes control to block 126 when any of the further scans that are processed decodes into a UPC-A symbol or other symbology.

At block 108, the controller 70 checks whether a finder pattern of bars and spaces from the Databar-limited symbol matches a center guard pattern of bars and spaces from a valid UPC-A symbol. As noted above, the center guard pattern of every UPC-A symbol comprises a space, followed by a bar, followed by a space, followed by a bar, followed by a space and is five modules wide and can be characterized by a set of module widths (1,1,1,1,1). If this set is found in the module widths of the target symbol, then there is a chance that the target symbol is a UPC-A symbol, and there is a possibility that a misdecode might be declared immediately, or, more likely, that further tests should be performed. If this set is not found in the module widths of the target symbol at block 108, then the Databar-limited decode results are sent to block 126 for further processing.

The controller 70 could also check at the same block 108 whether a left or right guard pattern of bars and spaces from the Databar-limited symbol matches a (1,1) sequence from a valid UPC-A symbol. As noted above, each left or right guard pattern of every UPC-A symbol comprises a bar, followed by a space, followed by a bar and is three modules wide and can be characterized by a set of module widths (1,1,1). If this set is found in the module widths of the target symbol, then there is a chance that the target symbol is a UPC-A symbol, and there is a possibility that a misdecode might be declared immediately, or, more likely, that further tests should be performed. If this set is not found in the module widths of the target symbol, then the Databar-limited decode results are sent to block 126 for further processing.

The various screening checks at block 108 reduce the number of potential misdecodes to a relatively small number, which is termed a "blacklist." Only Databar-limited symbols containing a few finder patterns out of a set of 88 different combinations can be embedded in a UPC-A symbol. Thus, the elements in the vicinity of a (1,1,1,1) sequence are examined to establish whether they contain sequences characteristic to those blacklisted finder patterns. In some systems, it might be also possible to store a complete blacklist of possible Databar-limited symbols, which can be embedded inside a UPC-A/EAN-13 symbol, and then this stored blacklist is used to evaluate the chance of a misdecode. The controller 70 stores this blacklist in memory, and checks whether the Databar-limited finder pattern, or the complete Databar-limited symbol, is or is not on the blacklist. If it is, then the decode could be either a UPC-A fragment or a Databar-limited symbol, in which case, the controller 70 checks at block 110 whether contextual information from the Databar-limited symbol is available to confirm that the target symbol is indeed a Databar-limited symbol. If such context is not available, then the controller 70 sets the counter to a negative count value (−Const1) at block 118, and, if the session time has not elapsed, then the controller 70 repeats the functions of blocks 100, 102, 103, 104, 106, 120, 122 and 124 until the predetermined count has been met.

To see if such context is available, the controller 70 checks at block 112 whether the context is compatible with a UPC-A symbol. In the case of an omnidirectional reader, after decoding of the blacklisted target symbol, scanning continues, and an attempt is made to create a composite scan, which is composed of several previous scan fragments. If another, longer, or safer decode is obtained from the composite scan, then the initial decoding is withheld. For example, if there are two scans with a recognizable overlap, they are stitched together, and the controller determines if this composite scan can result in a safe decode. If it does not, then the controller continues acquiring new scans until either a safe decode is obtained, or the composite scan is not extended by adding new scans, or a maximum number of scans has been reached. In the case of an imaging reader, after decoding of the target symbol, a section of the captured image in the vicinity of the virtual scan line is analyzed in order to find out whether it is possible to obtain another decode from an extended or tilted scan line. If another, longer, or safer decode is obtained, then the initial decoding is withheld. For example, the controller 70 determines if an initial shortened decode due to a tilted scan line is improved by another scan line, e.g., one extending entirely across the center of the target symbol, thereby enabling more context to be obtained. If the improved scan line results in finding additional bars of similar width, in an area consistent with being part of another symbol, then the Databar-limited decode is rejected and disabled at block 114, even if the scan line does not result in a decode of another symbology. On the other hand, if the improved scan line does not find additional bars of similar width in the vicinity of the symbol, and the symbol is not too close to the boundaries of the captured image, then the Databar-limited decode can be confirmed directly, and sent to the block 126 for further processing.

As an alternative to disabling the Databar-limited decode at block 114, the controller 70 could sets the counter to a higher negative count value (−Const2) at block 116, and, if the session time has not elapsed, then the controller 70 repeats the functions of blocks 100, 102, 103, 104, 106, 120, 122 and 124 until the predetermined count has been met.

Another screening step involves having the controller 70 enable decoding of UPC-A symbols at block 102 at all times, even if decoding of the UPC-A symbology is disabled, in order to find out whether the decoded data represent a symbol of the disabled symbology. If this is true, and if additionally a Databar-limited symbol was decoded, then the Databar-limited decode will be canceled if the data which produced it is contained in that of the UPC-A symbol.

One type of context that the controller can look for involves determining if extra bars are found in the data next to the Databar-limited symbol, and, if so, increasing the safety margin requirement. One type of safety margin is redundancy, as shown in block 118. That is, a potentially misdecoded symbol can be required to be decoded several times, each with the identical result, before a successful decode is declared. This delay gives the reader an improved chance to decode the correct symbol. While the Databar-limited symbology calls for redundancy checks, the symbology does not call for redundancy checks that are dependent on the symbol content. While this may reduce decode aggressiveness for Databar-limited symbols, only a small subset of such symbols is affected.

An additional contextual analysis involves determining if any bars or spaces are wider than 4 times the unit module width, and/or if every two bars and two spaces add up to a sum of 7 modules. The structural characteristics are indicative of a UPC-A symbol.

It will be understood that each of the elements described above, or two or more together, also may find a useful application in other types of constructions differing from the types described above.

While the invention has been illustrated and described as embodied in electro-optical readers, it is not intended to be limited to the details shown, since various modifications and structural changes may be made without departing in any way from the spirit of the present invention. For example, the misdecode described above for UPC-A symbols is equally applicable to EAN-13 symbols.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An arrangement for minimizing misdecodes of GS 1 DataBar Limited (Databar-limited) symbols in a reader for electro-optically reading symbols of different symbologies, comprising:
a data capture assembly for capturing light from a target symbol, and for generating an electrical signal indicative of the captured light;
a controller for processing and decoding the electrical signal, for determining whether the decoded signal is indicative of a Databar-limited symbol, and for determining in the event that the decoded signal is indicative of the Databar-limited symbol whether the decoded signal has characteristics indicative of a fragment of a Universal Product Code (UPC) Version A (UPC-A) symbol, and for performing in the event that the decoded signal is indicative of a fragment of a UPC-A symbol at least one additional operation including one of (1) determining whether a context is compatible with a UPC-A symbol and (2) repeating decoding of the same target symbol at least one more time, wherein said repeating decoding of the same target symbol includes capturing light from the same target symbol and decoding the electrical signal generated from the captured light of the same target symbol.

2. The arrangement of claim 1, wherein the data capture assembly includes a laser for emitting a laser beam, a scanner for sweeping the laser beam in a scan line across the target symbol for reflection and scattering therefrom, and a detector for detecting the captured light from the target symbol.

3. The arrangement of claim 1, wherein the data capture assembly includes a solid-state imager having an array of sensors for detecting the captured light in a virtual scan line from the target symbol.

4. The arrangement of claim 1, wherein the controller is operative for checking whether a finder pattern of bars and spaces from the Databar-limited symbol matches a part of a pattern of bars and spaces from a valid UPC-A symbol.

5. The arrangement of claim 1, wherein the controller is operative for checking whether a finder pattern of bars and spaces from the Databar-limited symbol matches one of a set of patterns of bars and spaces known to be compatible with valid UPC-A symbols.

6. The arrangement of claim 1, wherein the controller is operative for checking whether contextual information from the Databar-limited symbol is available.

7. The arrangement of claim 6, wherein the controller is operative for delaying the decoding when one of the following conditions is met: the contextual information is unavailable; the contextual information is incompatible with another symbology; decode redundancy criteria is fulfilled; and the contextual information is found to be incompatible with the symbology.

8. The arrangement of claim 1, wherein the controller is operative for also determining whether the decoded signal is indicative of a UPC-A symbol.

9. The arrangement of claim 8, wherein the controller is operative for combining a plurality of decodes to obtain a composite decoded signal indicative of the UPC-A symbol.

10. A method of minimizing misdecodes of GS 1 DataBar Limited (Databar-limited) symbols in a reader for electro-optically reading symbols of different symbologies, comprising the steps of:
capturing light from a target symbol, and generating an electrical signal indicative of the captured light;
processing and decoding the electrical signal, and determining whether the decoded signal is indicative of a Databar-limited symbol, and determining in the event that the decoded signal is indicative of the Databar-limited symbol whether the decoded signal has characteristics indicative of a fragment of a Universal Product Code (UPC) Version A (UPC-A) symbol; and
performing, in the event that the decoded signal is indicative of a fragment of a UPC-A symbol, at least one additional operation including one of (1) determining whether a context is compatible with a UPC-A symbol and (2) repeating decoding of the same target symbol at least one more time, wherein said repeating decoding of the same target symbol includes capturing light from the same target symbol and decoding the electrical signal generated from the captured light of the same target symbol.

11. The method of claim 10, wherein the capturing step is performed by emitting a laser beam, sweeping the laser beam in a scan line across the target symbol for reflection and scattering therefrom, and detecting the captured light from the target symbol.

12. The method of claim 10, wherein the capturing step is performed by exposing an array of sensors of a solid-state imager to detect the captured light in a virtual scan line from the target symbol.

13. The method of claim 10, and checking whether a finder pattern of bars and spaces from the Databar-limited symbol matches a part of a pattern of bars and spaces from a valid UPC-A symbol.

14. The method of claim 10, and checking whether a finder pattern of bars and spaces from the Databar-limited symbol matches one of a set of patterns of bars and spaces known to be compatible with valid UPC-A symbols.

15. The method of claim 10, and checking whether contextual information from the Databar-limited symbol is available.

16. The method of claim 15, and delaying the decoding when one of the following conditions is met: the contextual information is unavailable; the contextual information is incompatible with another symbology; decode redundancy criteria is fulfilled; and the contextual information is found to be incompatible with the symbology.

17. The method of claim 10, and determining whether the decoded signal is indicative of a UPC-A symbol.

18. The method of claim 17, and combining a plurality of decodes to obtain a composite decoded signal indicative of the UPC-A symbol.

\* \* \* \* \*